(12) United States Patent
Arnold et al.

(10) Patent No.: US 6,360,696 B1
(45) Date of Patent: Mar. 26, 2002

(54) CHEW TOY FOR DOMESTIC FERRETS AND SIMILAR SMALL PETS

(76) Inventors: Faith-Ann Arnold, 3759 York Blvd., Los Angeles, CA (US) 90065; Don Hunt, 846 N. McCadden Pl., Los Angeles, CA (US) 90038

( * ) Notice: Subject to any disclaimer, the term of this patent is extended or adjusted under 35 U.S.C. 154(b) by 0 days.

(21) Appl. No.: 09/532,174

(22) Filed: Mar. 21, 2000

Related U.S. Application Data

(63) Continuation-in-part of application No. 09/261,679, filed on Mar. 3, 1999, now abandoned, which is a continuation-in-part of application No. 08/870,865, filed on Jun. 6, 1997, now abandoned.

(51) Int. Cl.[7] .............................................. A01K 29/00
(52) U.S. Cl. ...................... 119/710; 119/709; 119/707
(58) Field of Search ................................. 119/709, 710, 119/711, 707; 426/2, 104

(56) References Cited

U.S. PATENT DOCUMENTS

| | | | |
|---|---|---|---|
| 3,891,774 A | | 6/1975 | Baker et al. ................. 426/104 |
| 3,899,607 A | | 8/1975 | Miller et al. ................. 426/285 |
| 4,125,630 A | | 11/1978 | Orthoefer .................... 426/104 |
| 4,419,372 A | * | 12/1983 | Greene et al. ............... 426/104 |
| 4,935,243 A | * | 6/1990 | Borkan et al. .............. 424/441 |
| 4,997,671 A | | 3/1991 | Spanier ...................... 426/646 |
| 5,240,720 A | * | 8/1993 | Axelrod ........................ 426/2 |

* cited by examiner

*Primary Examiner*—Charles T. Jordan
*Assistant Examiner*—John W. Zerr
(74) *Attorney, Agent, or Firm*—Jacqueline S. Larson

(57) ABSTRACT

The present invention is directed to improved pet toys that are safe and attractive to small pets having sharp teeth, such as ferrets. The chew toy of the invention contains from 41 to 60 weight percent (wt %) gelatin, from 10 to 40 wt % plasticizer, and from 10 to 25 wt % water. The toy simulates the texture and consistency of rubber, but will dissolve in the animal's stomach and is easily digested.

13 Claims, 1 Drawing Sheet

CHEW TOY FOR DOMESTIC FERRETS AND SIMILAR SMALL PETS

RELATED CASES

This application is a Continuation-in Part of patent application Ser. No. 09/261,679, filed Mar. 3, 1999 now abandoned which is a Continuation-in-Part of patent application Ser. No. 08/870,865, filed Jun. 6, 1997, now abandoned, the entire disclosures of which are incorporated herein by reference.

TECHNICAL FIELD

This invention relates to pet toys, and is particularly directed to improved chew toys for domestic ferrets and the like.

BACKGROUND OF THE INVENTION

Within the last few decades, ferrets have gained popularity as domestic pets. However, ferrets have unique needs and preferences due to their small size and small and very sharp teeth, which create a need for toys designed especially for such animals. Ferrets prefer to chew on articles having a soft, rubbery consistency, such as rubber, foam rubber, latex, vinyl, cloth, rope, and similar materials. However, the ferret's very sharp teeth tend to shear off pieces of these substances, which can be swallowed and block the ferret's digestive tract, causing serious and often fatal results. Furthermore, these substances have no nutritional value.

Prior art chew toys are primarily directed to use by dogs. Prior art chew toys made from material such as hard plastic will not attract the interest of ferrets. Other prior art chew toys such as those represented in U.S. Pat. Nos. 2,988,045, 3,123,047, 3,441,001, 4,260,635, 4,880,642, 5,114,704, 5,200,212, 5,240,720, 5,419,283, and 5,476,069 are at least partially digestible and therefore considered reasonably safe, but are also too hard (and in many instances too large) to be of much interest to ferrets.

For example, U.S. Pat. No. 5,240,720 discloses a dog chew that is extremely hard, with no rubbery characteristics. Plasticizers are not included in the product's formulation. The chew can be modified by microwaving; this heating expands the size of air pockets in the chew, which reduces its density. While the lower density makes it easier for a dog to chew, it does not impart a solid rubbery texture. A rubbery texture is one of the features that most attract ferrets. Thus, the chews of this patent are not desirable for use with ferrets or other animals with small sharp teeth. U.S. Pat. No. 4,419,372 provides a digestible high protein chew for dogs. These chews have physical properties and appearance resembling rawhide; that is, they are hard, not rubbery and thus are also not desirable as ferret chew toys.

None of the prior art pet toys have been at all satisfactory and, on the contrary, have often been highly detrimental to ferrets.

SUMMARY OF THE INVENTION

The disadvantages of the prior art are overcome with the present invention. More particularly, the present invention is directed to improved pet toys that are safe and attractive to small pets having sharp teeth, such as ferrets. The pet toys of the invention are characterized by being both tough and rubbery. By "rubbery" is meant that the toy is elastic and resilient; that is, it has the ability to bounce or spring back into shape after being stretched or, especially, compressed. The chew toy of the invention simulates the texture and consistency of rubber, but will dissolve in the animal's stomach and is easily digested. The toys of the invention are neither hard nor brittle.

The chew toy of the invention contains from 41 to 60 weight percent (wt %) gelatin, from 20 to 40 wt % plasticizer, and from 12 to 25 wt % water. The toy may also optionally contain as additional additives, small amounts of sweeteners or flavorings (such as, for example, vanillin, fruit juices, pureed bananas, pureed raisins, molasses, malt syrup, meat- or vegetable-flavored broth, and the like), nutrients (such as vitamins), colorants (such as beta-carotene, for example), minerals (such as, for example, di- or tricalcium phosphate), and preservatives. Also, digestible textural or filler material (such as edible bits of meat, animal hide, high protein meal of animal origin, and the like) may be added to enhance the appeal of the toy for ferrets. The total amount of optional additives will be from 0 to about 10 wt %, and preferably from 0 to about 5 wt %.

The chew toy of the present invention promotes the health and welfare of ferrets by not only satisfying the ferrets' need to chew on a rubbery substance, but also by occupying and amusing the ferrets, by distracting them from chewing on other objects that may be dangerous, by helping exercise the jaw muscles safely in an environment where the ferrets would not otherwise have the opportunity for such safe exercise, and by satisfying their instinct to hoard.

DETAILED DESCRIPTION OF THE INVENTION

Figure 1:
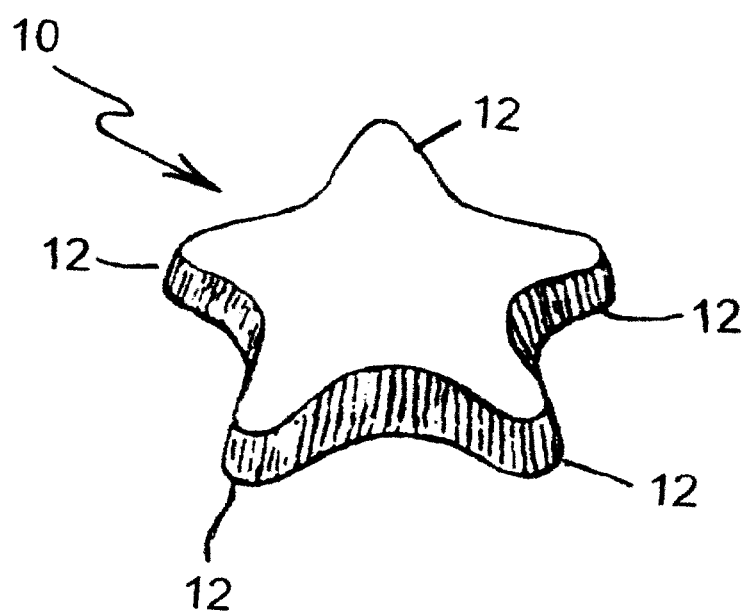
FIG. 1 is a perspective view (from above) of a pet treat embodying the present invention.

The terms "a" and "an" mean "one or more" when used herein.

In general, the products of this invention are made by preparing a homogeneous mixture of edible gelatin, plasticizer, and water. The resulting moist material is subjected to mechanical working at an elevated temperature (normally approximately 185° to 230° F.) until a flowable mass is formed and the gelatin particles are dissolved. This mass is then poured into molds of a desired shape and cooled to about 0° to 50° F. The molded toys are dried for approximately 48 hours in an atmosphere of about 50% humidity or less until the water content is reduced to approximately 12% to 25%. The final product will contain about 41 to 60 wt % gelatin and preferably about 45 to 50 wt %, about 20 to 40 wt % plasticizer and preferably about 25 to 35 wt %, and about 12 to 25 wt % water, preferably about 16% to 23 wt %. The toys are then packaged, preferably in moisture-proof containers or packages to reduce further dehydration or moisture reabsorption.

In order to be attractive to ferrets, the toy must have a desired degree of pliability and elasticity, yet must be tough enough to withstand hours of chewing.

The use of gelatin in an amount of 41% or greater to give a solid, tough yet rubbery chew toy is unexpected. Gelatin normally becomes much too soft when dissolved in water to be useful as a toy, whereas in its dried state it is too hard and brittle to be effective as a chew toy for pets. Pieces of dried gelatin are very sharp and could cause injury if chewed on. Thus, in the prior art, gelatin has been used in smaller amounts as a binder for the main ingredient(s). It has not until now been used as the main ingredient to give a solid rubbery toy. Surprisingly, it has now been found that edible gelatin in an amount of from 41 to 60 wt %, preferably about 45 to 50 wt %, more preferably about 47 wt %, when combined with an edible plasticizer in an amount of from 20 to 40 wt %, preferably about 25 to 35 wt %, more preferably about 31 wt %, provides a chew toy that is suitable for ferrets and similar animals.

The plasticizer is derived from a vegetable source and is preferably glycerin or glycerol, more preferably glycerin. It should be noted that glycerin has a laxative effect and if ingested in moderate quantities, it causes diarrhea in humans and animals. In previous chew toys, glycerin, when present at all, is usually in only small amounts. Where glycerin is present in higher amounts in prior art toys, the toys exhibit a substantial hardness so that not much will be ingested quickly (see, e.g., U.S. Pat. No. 4,419,372). In contrast, the chew toys of the present invention are soft enough so that dogs, which encompass the state of the chew toy prior art, would ingest large quantities in minutes, causing diarrhea. Thus, the chew toys of the present invention are not effective for use with dogs. Ferrets, however, because of the nature of their teeth and their chewing habits, will ingest only very small amounts of the chew toy of the invention over longer periods of time, so that the amount of glycerin consumed at one time would be too small to induce substantial diarrhea.

In that form of the present invention chosen for purposes of illustration, FIG. 1 shows a pet toy 10, formed generally in the shape of a star having a plurality of relatively small projections 12, which fit conveniently into the mouths of small pets, such as ferrets.

The resulting chew toy 10 has a consistency that is preferred by ferrets. That is, it is not brittle, but has a solid rubbery texture that is retained even after substantial chewing by the ferret.

The invention is further illustrated by the following specific but non-limiting example, which is not to be construed as limitations on the scope of the invention. Many other variations are possible.

EXAMPLE

Glycerin (49 oz.), gelatin granules (82 oz.; contains about 10–12% water), and hot tap water (69 oz.) are combined and cooked slowly at between 190°–220° F. in a covered container for about 2 hours. After the mixture has been cooked, vanillin (2 g) dissolved in pureed chicken in broth (2 oz.), and dicalcium phosphate anhydrous powder (4.6 oz, which has been mixed with 12 oz. water, blended and strained) are added and stirred to give a homogeneous mixture. This mixture is then poured into open molds and chilled until it is firm and holds the shape of the mold. The product is unmolded, placed on a rack, and set in a room with a dehumidifier and fans to speed drying. The humidity in the drying room is preferably kept under 50%, but it can vary between 30% and 70%. The temperature of the room is kept below about 90° F. The toys are dried until they reach a desired water content of between about 16 wt % and 23 wt %.

What is claimed is:

1. A chew toy suitable for domestic ferrets, consisting essentially of:
   from 41 to 60 wt % edible gelatin;
   from 20 to 40 wt % edible plasticizer; and
   from 12 to 25 wt % water;
the chew toy exhibiting a solid rubbery texture.

2. The chew toy of claim 1 wherein the plasticizer is glycerin.

3. A chew toy suitable for domestic ferrets, consisting essentially of:
   from 45 to 50 wt % gelatin;
   from 25 to 35 wt % plasticizer; and
   from 16 to 23 wt % water;
the chew toy exhibiting a solid rubbery texture.

4. The chew toy of claim 3 wherein the plasticizer is glycerin.

5. The chew toy of claim 3 consisting essentially of 47 wt % gelatin, 31 wt % glycerin, and 19 wt % water.

6. The chew toy of claim 1 containing from 0 to 5 wt % dicalcium phosphate.

7. The chew toy of claim 5 containing from 0 to 3 wt % dicalcium phosphate.

8. The chew toy of claim 1 containing from 0 to 10 wt % flavoring.

9. The chew toy of claim 1 containing from 0 to 5 wt % flavoring.

10. The chew toy of claim 3 containing from 0 to 10 wt % of an additive selected from the group consisting of sweeteners, flavorings, nutrients, colorants, minerals, preservatives, digestible textural material, and digestible filler material.

11. The chew toy of claim 10 wherein the additive is flavoring.

12. The chew toy of claim 5 containing from 0 to 5 wt % flavoring.

13. The chew toy of claim 3 containing from 0 to 5 wt % dicalcium phosphate.

* * * * *